United States Patent [19]

Abromeit

[11] Patent Number: 4,838,227
[45] Date of Patent: Jun. 13, 1989

[54] METHOD OF PREVENTING VIBRATION NOISE IN CHANGE-SPEED GEARBOXES, IN PARTICULAR OF MOTOR VEHICLES

[75] Inventor: Gerhard Abromeit, Cologne, Fed. Rep. of Germany

[73] Assignee: Ford Motor Company, Dearborn, Mich.

[21] Appl. No.: 132,385

[22] Filed: Dec. 15, 1987

[30] Foreign Application Priority Data

Dec. 22, 1986 [DE] Fed. Rep. of Germany ....... 3643943

[51] Int. Cl.[4] .................... F02D 43/04; B60K 41/04
[52] U.S. Cl. .................................. 123/419; 123/436
[58] Field of Search .............. 123/406, 419, 436, 478; 74/857

[56] References Cited

U.S. PATENT DOCUMENTS

| 4,266,447 | 5/1981 | Heess et al. ........................... 74/858 |
| 4,613,029 | 9/1986 | Beccaris ........................... 192/106.2 |
| 4,683,856 | 8/1987 | Matsuura et al. ............... 123/419 X |

Primary Examiner—Tony M. Argenbright
Attorney, Agent, or Firm—Peter Abolins; Clifford L. Sadler

[57] ABSTRACT

In a method of preventing vibration noise in change-speed gearboxes, in particular of motor vehicles, with an electronic control of the ignition and the fuel measuring control of the internal combustion engine which is variable timewise as a function of events, the internal combustion engine is controlled as a function of the occurrence of gearbox vibration noise in order to change the combustion process of the said internal combustion engine so that no irregularities occur in the rotational vibration behavior.

2 Claims, 1 Drawing Sheet

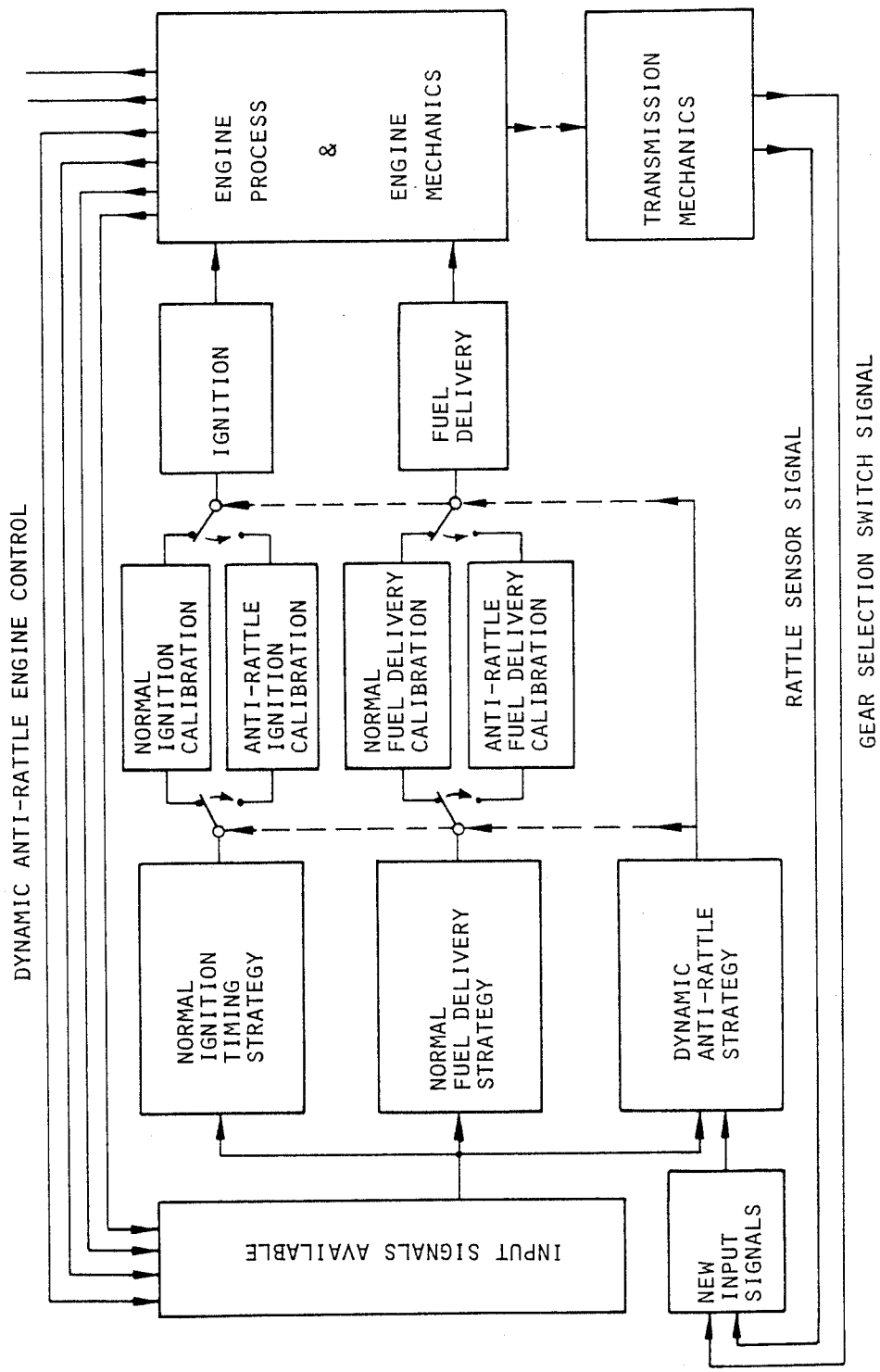

METHOD OF PREVENTING VIBRATION NOISE IN CHANGE-SPEED GEARBOXES, IN PARTICULAR OF MOTOR VEHICLES

The invention relates to a method of preventing vibration noise in change-speed gearboxes, in particular of motor vehicles.

A method of controlling an internal combustion engine of a motor vehicle drive while changing the gears of a multiple-speed gearbox is known from the European Patent 00 11 088, in which the electronic control of the ignition and the fuel measuring control of an internal combustion engine is variable timewise as a function of events so that shifting back when changing gear does not cause annoyance.

In present-day modern change-speed gearboxes for motor vehicles, in which a favourable degree of efficiency of the change-speed gearbox is achieved by complicated bearing means, it has been found that in conjunction with an internal combustion engine, which is controlled by means of an electronic control of the ignition and the fuel measuring control to produce as lean as possible a combustion procedure so as to achieve a favourable waste gas and consumption behaviour, the irregularities in the rotational vibration behaviour of the internal combustion engine, which arise in such a lean combustion procedure, in particular when the change-speed gearbox is in the idling position, but also under a slight load with gears engaged, lead to an undesired gearbox vibration noise.

Although widely differing steps for overcoming vibration noise in change-speed gearboxes are known to the person skilled in the art in the field of gearboxes, they generally comprise secondary steps, such as for example in the use of rotational vibration dampers or in that various elements of the change-speed gearbox are clamped together in a resilient manner or parts of the change-speed gearbox are braked in a sliding manner.

These known steps thus impair the efficiency of the change-speed gearbox in each case and additionally often necessitate a considerable mechanical structural outlay.

The object of the invention is to provide a method of preventing vibration noise in change-speed gearboxes, in particular of motor vehicles, in which with minimum structural outlay action is taken merely in the form of providing specific control signals to an electronic control of the ignition and the fuel measuring control already present in the motor vehicle and so the combustion process of the engine causing the gearbox vibration noise can be directly controlled.

In this electronic control means only one altered performance-characteristic control is provided, which comes into action timewise in accordance with events.

This object is attained according to the invention in that a method of preventing vibration noise in change-speed gearboxes, in particular of motor vehicles, is set up on an engine control device.

By virtue of the fact that the internal combustion engine is controlled as a function of the occurrence of the gearbox vibration noise in order to change the combustion process of the said internal combustion engine so that no irregularities or minor irregularities occur in the rotational vibration behaviour, essentially by providing control signals and a stored performance characteristic control the gearbox vibration noise which occurs in an annoying manner only in specific operating states is prevented by a dynamic control of the combustion process of the internal combustion engine.

In this connection, the necessary control signals are supplied by a gear selector disposed on the changespeed gearbox and a gearbox vibration noise sensor (in the manner of a knock sensor) and they switch over the control of the ignition and the fuel measuring control of the internal combustion engine from a performance-characteristic control for normal running to a performance-characteristic control for gearbox vibration noises as a function of the occurrence of the gearbox vibration noise.

The invention is explained in greater detail with reference to a circuit diagram illustrated in the accompanying drawing, in which:

The FIGURE shows a control diagram of the method for preventing vibration noise in change-speed gearboxes, in particular of motor vehicles.

On account of its explanatory captions the circuit can be understood by the person skilled in the art of control means without special explanation.

In this connection, it should merely be pointed out that the expression "existing control signals" refers to the control signals customary for a conventional electronic control of an internal combustion engine, such as engine speed, throttle valve position, engine temperature, vehicle speed and the like, and that the expression "new control signals" refers for example to a gear selector control signal and a gearbox vibration noise control signal.

The idling position or neutral position or even the gear of the change-speed gearbox selected in each case is preferably determined by the gear selector.

The gearbox vibration noise control signal can be generated by a shock or vibration sensor mounted on the gearbox casing and designed as is known in various embodiments for example for detecting a knocking combustion process in internal combustion engines. The two new control signals, the gear selection control signal and the gearbox vibration noise control signal, are passed on to a dynamic anti-gearbox-vibration-noise control means, which on the basis of the signals received determines whether gearbox vibration noises are occurring in such a way as to require a suitable counter control to be undertaken. If this is the case, a change-over takes place from a performance-characteristic control for normal running to a performance-characteristic control designed for the case of gearbox vibration noises, as a result of which for example the ignition and the fuel measuring control to the internal combustion engine take place in such a way that for example the ignition point and the fuel measuring control are changed in order to achieve an improved ignition and a more suitably adjusted fuel-air mixture, as a result of which the irregularities in the rotational vibration behaviour of the internal combustion engine, which are particularly accentuated on account of a lean combustion process, are prevented.

The dynamic anti-gearbox-vibration-noise control means can be designed in the form of a "closed loop system" which in conjunction with a design as a "self-learning system" can also compensate effects on the basis of production tolerances or repairs and deviations during operation of the internal combustion engine over the total service life of the vehicle.

The described control means according to the invention can be readily produced with the hardware at present available in the field of microprocessors and the software development possible today.

I claim:

1. A method of preventing vibration noise in change-speed gearboxes, in particular of motor vehicles, with an electronic control of the ignition and the fuel measuring control of the internal combustion engine which is variable timewise as a function of events, characterized by:

controlling the internal combustion engine as a function of the occurrence of gearbox vibration noise; and changing the combustion process of the said internal combustion engine so that no irregularities occur in the rotational vibration behaviour.

2. A method according to claim 1, characterized by:

providing a gear selector and a gearbox vibration noise sensor on the change-speed gearbox, and passing their control signals on to a dynamic anti-gearbox-vibration-noise control means inside the electronic control, which carries out the step of changing over from a performance-characteristic control for normal running to a performance-characteristic control for the occurrence of gearbox vibration noises.

* * * * *